US012184026B2

(12) United States Patent
Villard et al.

(10) Patent No.: US 12,184,026 B2
(45) Date of Patent: Dec. 31, 2024

(54) TERMINAL BLOCK CONFIGURED TO RECEIVE NON-STRIPPED WIRE ENDS

(71) Applicant: Tyco Electronics France SAS, Pontoise (FR)

(72) Inventors: Romain Villard, Pontoise (FR); Philippe France, Pontoise (FR); Yannick Villardier, Pontoise (FR)

(73) Assignee: Tyco Electronics France SAS, Pontoise (FR)

( * ) Notice: Subject to any disclaimer, the term of this patent is extended or adjusted under 35 U.S.C. 154(b) by 0 days.

(21) Appl. No.: 17/714,674

(22) Filed: Apr. 6, 2022

(65) Prior Publication Data

US 2022/0328986 A1 Oct. 13, 2022

(30) Foreign Application Priority Data

Apr. 8, 2021 (EP) .................................... 21305451

(51) Int. Cl.
*H01R 9/24* (2006.01)

(52) U.S. Cl.
CPC .................................... *H01R 9/24* (2013.01)

(58) Field of Classification Search
CPC ...... H01R 9/24; H01R 4/2433; H01R 4/4836; H01R 12/67; H01R 12/675; H01R 43/01
See application file for complete search history.

(56) References Cited

U.S. PATENT DOCUMENTS

| | | | | |
|---|---|---|---|---|
| 4,286,836 A * | 9/1981 | Rumps | H01R 4/2441 439/406 |
| 4,340,270 A * | 7/1982 | Wilmes | H01R 4/2433 439/417 |
| 4,348,070 A | 9/1982 | Simon | |
| 4,609,246 A | 9/1986 | Ustin et al. | |
| 5,622,517 A | 4/1997 | Heng et al. | |

(Continued)

FOREIGN PATENT DOCUMENTS

| | | |
|---|---|---|
| CN | 101019275 A | 8/2007 |
| CN | 101317303 A | 12/2008 |

(Continued)

OTHER PUBLICATIONS

European Search Report, Application No. EP21305451, Dated: Sep. 15, 2021, 3 pages.

(Continued)

*Primary Examiner* — Vanessa Girardi
(74) *Attorney, Agent, or Firm* — Barley Snyder

(57) ABSTRACT

A terminal block receiving non-stripped wire ends includes an insulating casing, a conductive part installed within the casing, and a displacement tool. The conductive part includes a cooperating slot defined by two cooperating blades forming an insulation-displacement contact connection of a non-stripped wire end. The cooperating blades are parallel to a connection axis of the connection part. The displacement tool displaces the non-stripped wire end in a direction of the connection axis from a disconnected position to a connected position. In the connected position, the two cooperating blades are in electrical contact with a central conducting core of the non-stripped wire end. The displacement tool is attached to the insulating casing by a connection element of the terminal block.

3 Claims, 2 Drawing Sheets

(56) References Cited

U.S. PATENT DOCUMENTS

| | | | |
|---|---|---|---|
| 7,399,197 | B2 | 7/2008 | Fasce et al. |
| 7,658,639 | B2 | 2/2010 | Hoppmann |
| 9,184,515 | B1 | 11/2015 | Freakes |
| 2006/0160404 | A1 | 7/2006 | Alarcon et al. |
| 2008/0184560 | A1 | 8/2008 | Pizzi |
| 2008/0233782 | A1 | 9/2008 | Hoppmann |

FOREIGN PATENT DOCUMENTS

| | | | |
|---|---|---|---|
| EP | 0352347 | A1 | 7/1988 |
| GB | 2293699 | A1 | 4/1996 |

OTHER PUBLICATIONS

Written Opinion, Application No. 21305451.3, Dated: Apr. 19, 2021, 9 pages.

Chinese First Office Action dated Sep. 21, 2023 with English translation, corresponding to Application No. 202210355233.8, 23 pages.

* cited by examiner

TERMINAL BLOCK CONFIGURED TO RECEIVE NON-STRIPPED WIRE ENDS

CROSS-REFERENCE TO RELATED APPLICATIONS

This application claims the benefit of European Patent Application No. 21305451.3 filed on Apr. 8, 2021, the whole disclosure of which is incorporated herein by reference.

FIELD OF THE INVENTION

The present disclosure relates to terminal blocks, and in particular, to a terminal block adapted to receive nonstripped wire ends.

BACKGROUND

According to the prior art, a wire end can be directly connected to a terminal block without stripping the end beforehand. In these applications, there is a need for an insulation-displacement contact connection that can cut an insulation of the wire end to access to a central conducting core of the wire end. As there is a need to cut the insulation to have form electrical contact, the terminal block should be equipped with a tool or adapted to receive an external tool for pushing the wire end in a connected position. Such a tool is required to be moved by hand to generate a sufficient force for cutting the insulation. It is known to use rotating devices built in the terminal block. In this case, the wire end is inserted in the terminal block and the rotating device moved by hand for forming the connection. There are other systems using external tools for pushing the inserted wire end from a disconnected position to the connected position.

These connection devices are useful in that they enable to realize an electrical connection. However, they utilize relatively elaborate mechanical assemblies in the case of a rotating device, and require the use of an external tool when pushing the wire end in the alternative solution.

Thus, there is a need for a connection assembly that is simplified and that necessitates a limited amount of components for ease of manufacturing. There is also a need for facilitating the use in field in the absence of a dedicated tool.

The present invention aims to solve all or some of the disadvantages mentioned above.

SUMMARY

According to an embodiment of the present disclosure, a terminal block for receiving non-stripped wire ends includes an insulating casing, a conductive part installed within the casing, and a displacement tool. The conductive part includes a cooperating slot defined by two cooperating blades of the conductive part for forming an insulation-displacement contact connection. The cooperating blades are parallel to a connection axis of the connection part. The displacement tool is adapted to displace the non-stripped wire end in a direction of the connection axis from a disconnected position to a connected position. In the connected position, the two cooperating blades are in electrical contact with a central conducting core of the non-stripped wire end. The displacement tool is attached to the insulating casing by a connection element of the terminal block.

BRIEF DESCRIPTION OF THE DRAWINGS

The invention will now be described by way of example with reference to the accompanying Figures, of which.

DETAILED DESCRIPTION OF THE EMBODIMENTS

Figure 1:
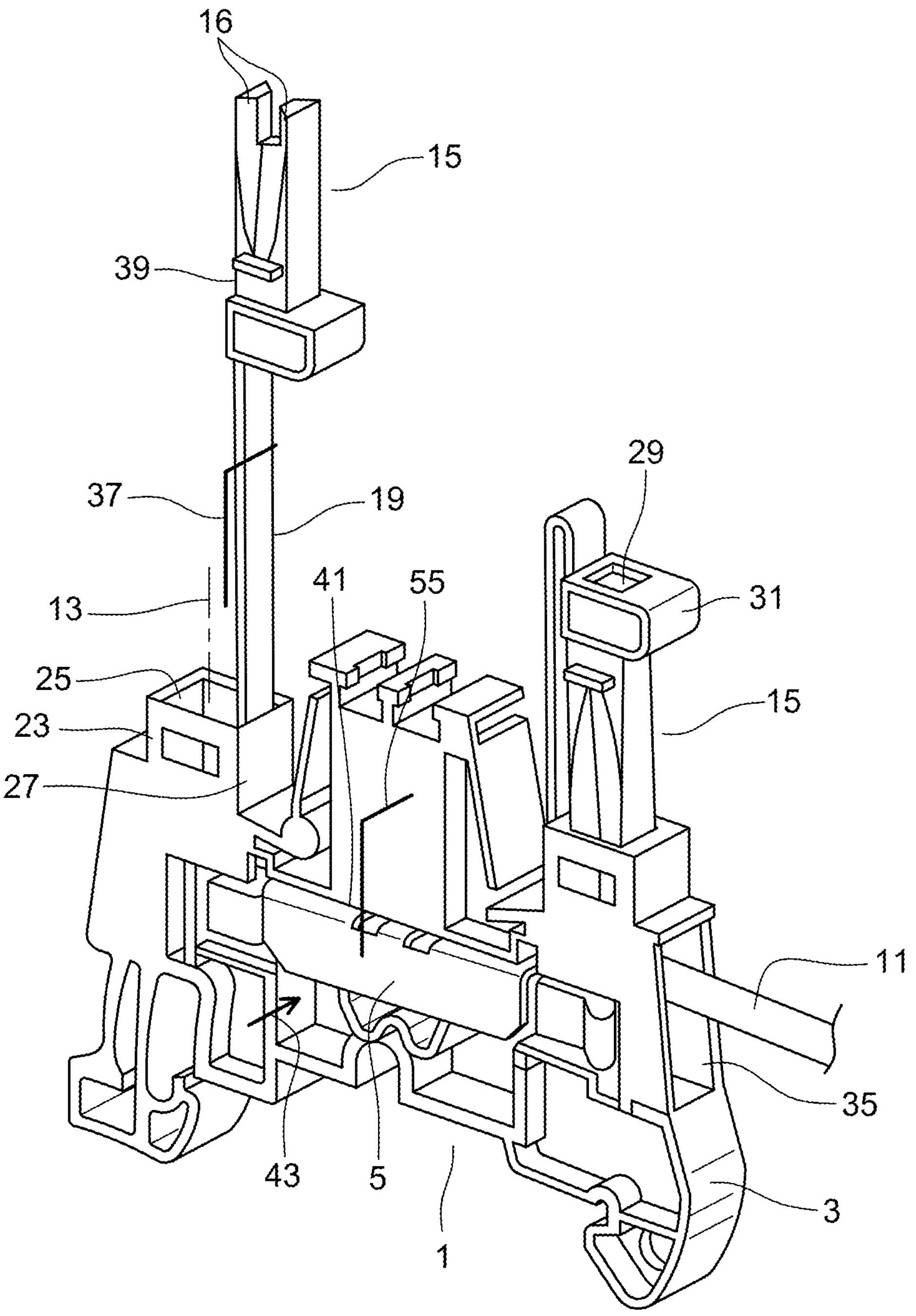
FIG. 1 is a perspective view of a terminal block configured to receive two non-stripped wire ends.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As illustrated in FIGS. 1 to 4, a terminal block 1 is adapted to receive two non-stripped wire ends. The terminal block 1 is also configured to be secured on a rail. The terminal block 1 includes an insulating casing or body 3 and a conductive part 5 installed in the insulating casing 3. The conductive part 5 defines a cooperating slot 7 formed by two cooperating blades 9 of the conductive part 5. The slot 7 and blades 9 define for an insulation-displacement contact connection for a non-stripped wire end 11. The cooperating blades 9 extend according to or along a connection axis 13.

The terminal block 1 also includes a displacement tool 15 (i.e., two displacement tools 15) configured to displace the non-stripped wire end 11 along the connection axis 13 from a disconnected position to a connected position. The displacement tool 15 is linked to the insulating casing 3 by a flexible tongue 19 of the terminal block 1.

Figure 2:
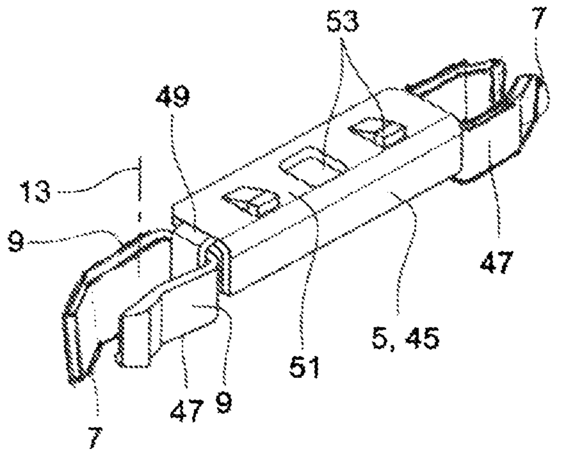
FIG. 2 is a perspective view of a conductive part of the terminal block.
Figure 3:
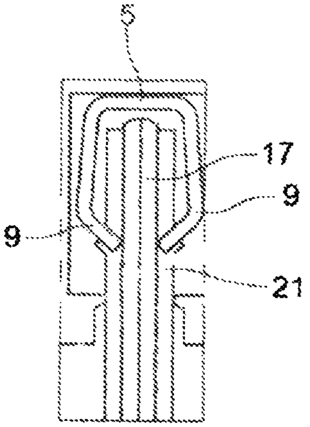
FIG. 3 is a top view of two cooperating blades of the conductive part and a wire end in a connected position.
Figure 4:
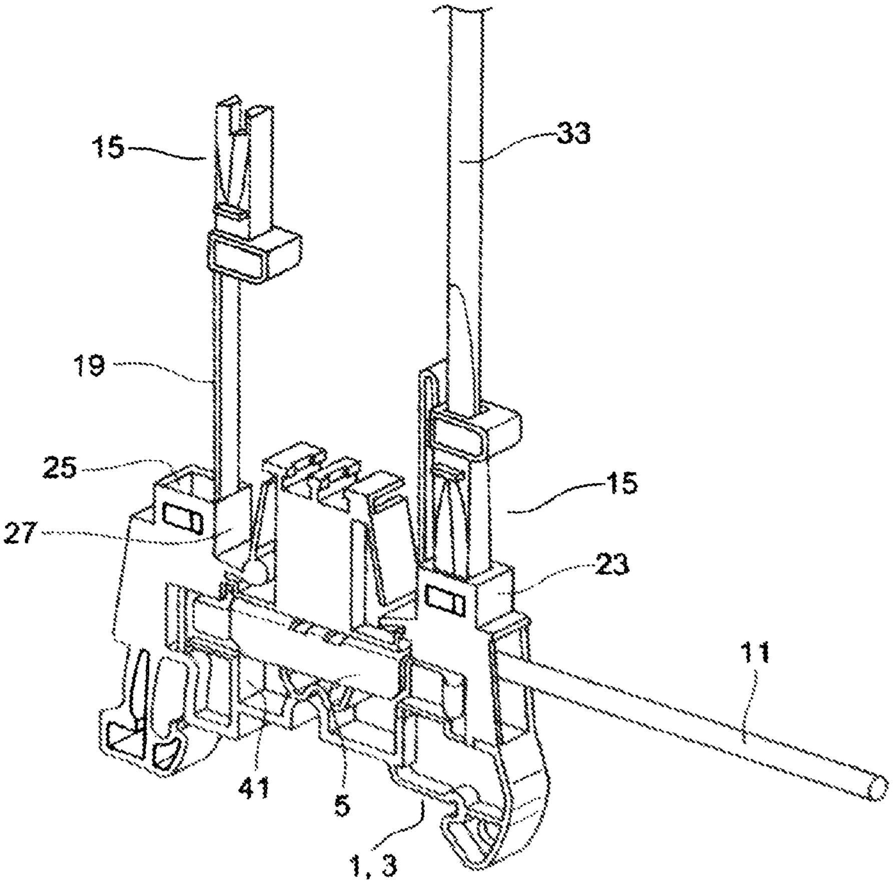
FIG. 4 is a perspective view of the terminal block and a screwdriver pushing a displacement tool of the terminal block.

FIG. 3 illustrates the connected position wherein the two cooperating blades 9 are in electrical contact with a central conducting core 17 of the non-stripped wire end 11. The cooperating blades 9 are sharpened and configured to cut an insulation 21 of the non-stripped wire end 11 to reach the central conducting core 17. As seen by comparing FIGS. 2-3, the cooperating blades 9 can be symmetrical or, alternatively, one pair of blades 9 may differ from the other for purposes of insertion or retention of the conductive part 5 in the insulating casing 3.

The tongue 19 extends substantially parallel to the connection axis 13 in the absence of forces acting thereon. The tongue 19 is adapted to be bent for half turning (i.e., rotating approximately 180 degrees) the displacement tool 15 from an initial position (left side of FIGS. 1 and 4) to an actuating position (right side of FIGS. 1 and 4) for pushing the non-stripped wire end 11 from the disconnected position to the connected position.

The tongue 19 is adapted to be bent and to be flexible enough to enable the half turn or rotation of the displacement tool 15. in one embodiment, the tongue 19 is a flat strip having a constant width and a constant thickness.

The insulating casing 3 is defines an inlet or nozzle 23 for introducing the displacement tool 15 slidably within an actuating channel 25 of the insulating casing to access and bias the non-stripped wire end 11 from the disconnected position to the connected position. The nozzle 23 comprises a wall 27 connected to or formed with the tongue 19 and extending in alignment with the tongue 19 in the absence of forces acting on the tongue 19. The actuating channel 25 defines a guide for the displacement tool 15 that enables a motion along the connection axis 13.

An actuating recess 29 is formed in a top part 31 of the displacement tool 15. The actuating recess 29 is sized and located to receive a screwdriver end 33 for pushing the non-stripped wire end 11 by the displacement tool 15 from the disconnected position to the connected position.

The insulating casing 3 is provided with an insertion opening 35 for receiving the non-stripped wire end 11. The insertion opening 35 is elongated and parallel to the connection axis 13 to enable the displacement of the non-stripped wire end 11 from the disconnected position to the connected position. The wire end extends transversally to the connection axis 13 when moved between the disconnected to the connected position.

The tongue 19 extends along or parallel to an extension plane 37 in the absence of forces acting thereon, the nozzle 23 and the displacement tool 15 extending in opposed or opposite directions transversally to the extension plane 37. In this way, the nozzle 23 and the displacement tool 15 are located on opposite sides of the extension plane 37.

The displacement tool 15 is provided with two push branches or protrusions 16. The cooperating slot 7 is positioned between the two push branches 16 when displacing the non-stripped wire end 11 is biased from the disconnected position to the connected position. Thus, the non-stripped wire end 11 is pushed on both sides of the cooperating slot 7 transversally to the connection axis 13 so that it remains correctly positioned.

The tongue 19 extends in alignment with an external side 39 of the displacement tool 15.

The insulating casing 3 defines a lateral opening 41 for receiving the conductive part 5. The lateral opening 41 being sized and located to enable the insertion of the conductive part 5 in a mounted position according to an insertion direction 43 that is transverse to the connection axis 13.

As illustrated in FIG. 2, the conductive part 5 includes a main body 45 having a U-shaped profile or cross-section extending transversally to the connection axis 13 and a side body 47 having a U-shaped profile extending along the connection axis 13. The cooperating blades 9 are formed on the side body 47, the main body 45 and the side body 47 being linked by a lamella or thin extension section or tab 49.

A central portion 51 of the main body 45 is provided with connecting elements 53 configured to cooperate or engage with complementary conducting elements to be plugged into or onto the terminal block 1. The plug type is a jumper bar connection, by way of example. The connecting elements 53 correspond to holes of the central portion 51. The main body 45, the side body 47 and the lamella 49 are integral and constitute the conductive part 5.

Similarly, the insulating casing 3, the tongue 19 and the displacement tool 15 may be integrally formed.

As illustrated in FIGS. 1 to 4, the conductive part 5 comprises two cooperating slots 7 each defined by two corresponding cooperating blades 9 of the conductive part 5 for two insulation-displacement contact connections of two non-stripped wire ends 11, the terminal block 1 includes two displacement tools 15, each corresponding to a cooperating slot 7.

The two connection axes 13 are parallel to each other. In addition, the two cooperating slots 7 are symmetrical with respect to a central plane 55 of the terminal block 1.

A method for manufacturing a terminal block 1 comprises a step of molding the insulating casing 3, the tongues 19 and displacement tools 15 and a step of inserting the conductive part in the insulating casing 3. The conductive part 5 is formed from a flat metal sheet that is cut and folded.

The displacement tool 15 is also part of the terminal block 1 and not used as a separate part. This is an advantage as, during manufacturing, there is no need for an additional reference of a separated part. In addition, as the displacement tool is always linked to the insulating casing 3, there is no need to have a specific tool for the person realizing the wire end connection.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A terminal block, comprising:

an insulating body adapted to be fixed to a rail and defining:

an insertion opening for receiving a non-stripped wire end which defines a wire axis;

an inlet at each end of the insulating body along the wire axis, for introducing respective first and second displacement tools within respective actuating channels which open along a connection axis; and a conductive part having a main body with a U-shaped profile extending along the wire axis, further comprising a side body at opposite ends of the main body, each side body having a U-shaped profile formed by cooperating blades, the main body and each side body are respectively joined by a tab; wherein both the first and second displacement tool each have two push branches such that the cooperating blades are positioned between the two push branches when displacing the non-stripped wire end along the connection axis.

2. The terminal block of claim 1, wherein the first and second displacement tools are movably attached proximate respective first and second ends of the insulating body and sized to be slidably received within the respective actuating channel.

3. The terminal block of claim 1, wherein the conductive element is laterally insertable into an opening formed in the insulating body.

* * * * *